May 30, 1950 H. E. JEFFERY 2,509,271
OPERATING AND CONTROL LEVER AND THE LIKE
Filed Jan. 31, 1947 3 Sheets-Sheet 3

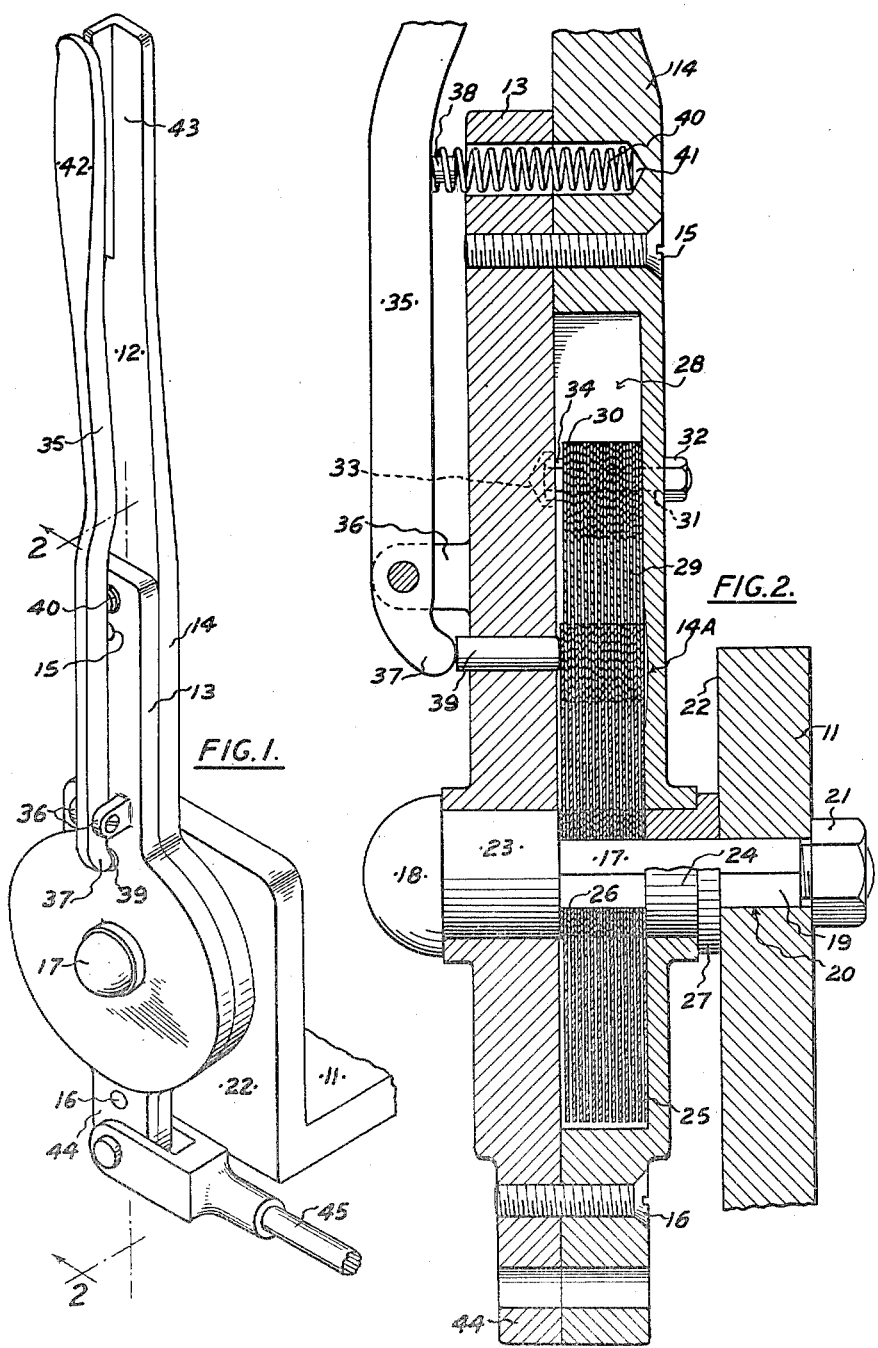

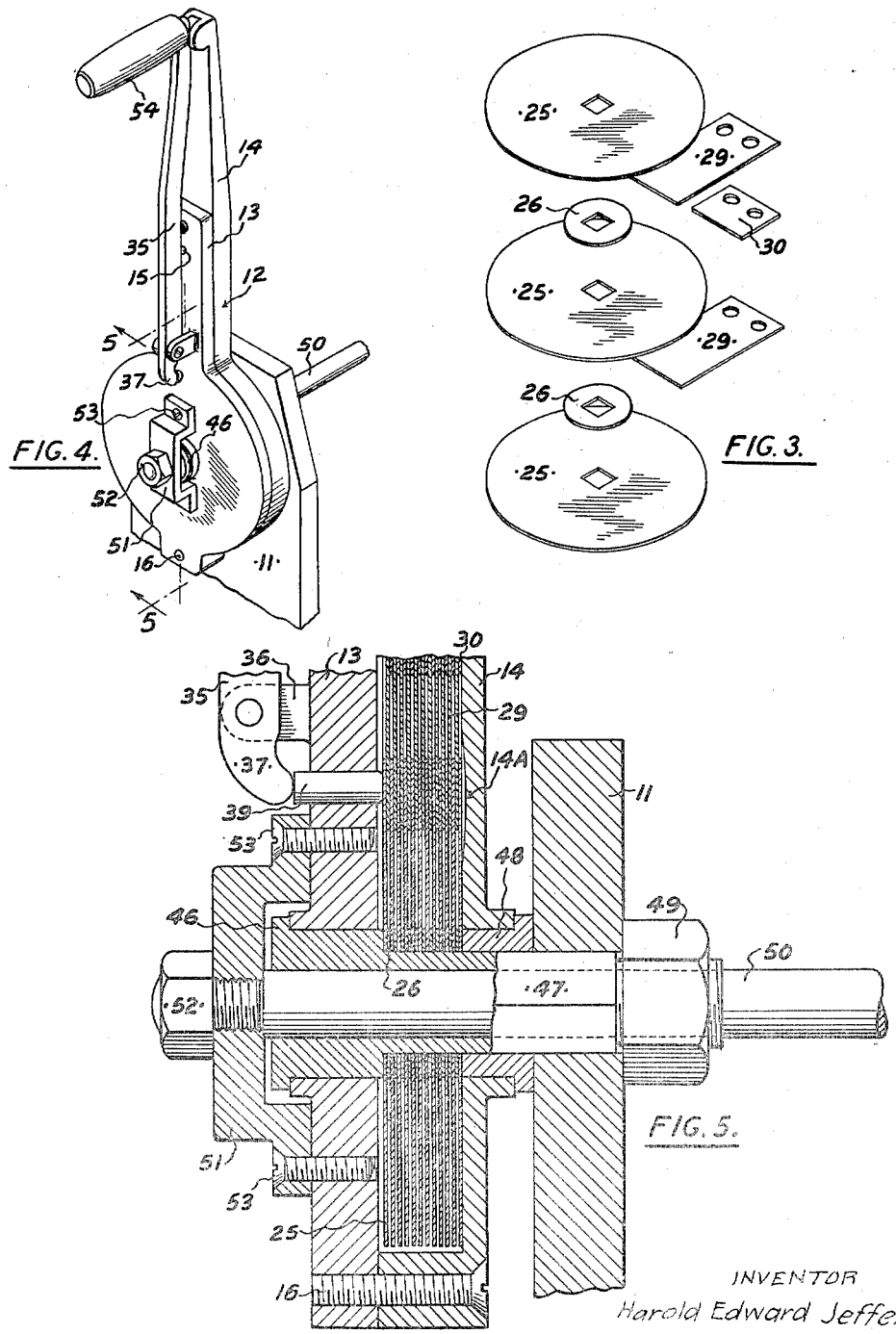

INVENTOR
Harold Edward Jeffery
By Robert E Burns
ATTORNEY

Patented May 30, 1950

2,509,271

UNITED STATES PATENT OFFICE 2,509,271

OPERATING AND CONTROL LEVER
AND THE LIKE

Harold E. Jeffery, Penshurst, near Sydney, New South Wales, Australia, assignor of part interest to Leonard Bowes Clarkson and John Bowes Clarkson, both of North Sydney, and Noel George Charley, Wahroonga, New South Wales, Australia Application January 31, 1947, Serial No. 725,519
In Australia March 26, 1946

19 Claims. (Cl. 3—12)

This invention relates to locking means for operating and control levers and the like, and more particularly to locking means for such levers which are required to be firmly held at any selected position within their range of adjustment. Examples of such levers are brake levers, clutch levers, hand levers for operating steam regulator valves, and control levers for variable-speed and reversible electric motors.

Levers of the type referred to are usually mounted for rotation about a pivotal axis near one end. As a rule, stops are provided to limit the angular movement of the lever, one end of the angular range of lever movement representing an "open" or "on" position, and the opposite limit position representing a fully "closed" or "off" position. One commonly used method for locking the lever at one or more intermediate positions between the limit positions is to provide a notched quadrant bracket, ratchet or the like fixed to the base on which the lever is pivoted, and to provide a spring-loaded pawl or spur on the lever which is adapted to engage the teeth of the notched quadrant bracket or the like. The pawl or spur may be operated by appropriate linkwork to allow it to be disengaged from the notched bracket or the like when it is desired to shift the control lever to some other position.

This known method for locking the lever at intermediate positions suffers from the disadvantage that, although it gives definite constant halting positions for the lever, the number of said positions is limited to the number of notches or teeth which may conveniently be provided in the quadrant bracket or the like.

A further known method for locking a lever at any one of a number of desired positions employs a disc clutch between the lever and the base to which it is pivoted. The disc clutch comprises two series of intermeshed circular thin metal plates, the plates of one series being secured to the base, and the plates of the other series being secured to the lever. The metal plates are normally sprung away from each other and allow relative rotation of the two series of plates with respect to each other. The plates may be locked in any desired position by releasing a spring loaded plate which forces the two series of plates against each other over their full surface area, or substantially their full surface area. This construction provides an unlimited number of possible halting positions for the lever, but is expensive to construct, and requires a large number of thin metal plates in each series of clutch plates.

It is, therefore, an object of this invention to provide an improved control lever which may be locked at any desired point within its range of angular movement, and which remains, when so locked at the selected position without slipping, until such time as it is intentionally moved from that selected position.

It is a further object of this invention to provide a control lever of the type employing a disc clutch for locking the control lever in any selected position within its range of angular movement which is simpler and less expensive to construct than the known types of control lever, and which requires considerably fewer thin metal plates in the two series of clutch discs than the known construction.

It is a further object of this invention to provide a control lever of the type employing a disc clutch for locking the control lever in any selected position within its range of angular movement in which the two series of clutch discs are locked by means of pressure applied at only one or a few points on the discs.

The present invention is particularly suited for use in the joints of artificial limbs, providing a simple, robust, and effective means for locking portions of the limb, which are rotatable with respect to each other, at any selected relative position. The disc clutches according to this invention may, for example, be employed at elbow joints, wrist joints, and finger joints of artificial limbs.

It is accordingly, a further object of this invention to provide improved artificial limbs employing the locking means of the present invention at some or all of the joints of the limb.

The invention in its most general form comprises improved means for locking relatively rotatable members in any desired relative position comprising a stack of substantially parallel plates secured to one member, a second stack of substantially parallel plates secured to the second member, said stacks of plates being interleaved over a comparatively small area adjacent to the edge of each stack, and means for applying pressure to or removing pressure from said interleaved area to prevent or allow relative rotation of said stacks of plates.

Some preferred forms of the invention will now be described with reference to the accompanying drawings, in which:

Fig. 1 is a perspective view of a control lever, e. g. a motor car brake lever incorporating locking means according to the invention.

Fig. 2 is an enlarged vertical section on the line 2—2 of Fig. 1.

Fig. 3 is an exploded view showing discs, plates, and spacers employed in the invention.

Fig. 4 is a perspective view of a control lever rotatable through 360° or more relative to an associated bracket and incorporating locking means according to the invention.

Fig. 5 is an enlarged vertical section on the line 5—5 of Fig. 4.

Figure 7:
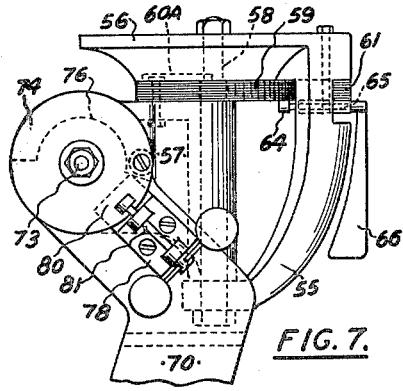
Fig. 7 is a similar view but with the forearm in a different position.

Referring to Figs. 1, 2 and 3, 11 is a fixed bracket and 12 is a control lever. The control lever is in two parts 13 and 14 secured together e. g. by screws 15 and 16. A bolt 17 having a cuphead 18 and a square shank 19 passes through a hole 20 in the bracket 11 and a nut 21 is screwed onto a reduced diameter cylindrical end of the shank 19.

The head 18 is spaced from a face 22 of the bracket 11 by means of a cylindrical bearing member 23, integral with the shank 19, a cylindrical bearing member 24 slidable but non-rotatable on the shank 19 and a stack of stationary friction plates 25 and spacing plates 26 also mounted on the shank 19. The member 24 has a flange 27.

The control lever 12 is rotatably mounted on the members 23 and 24 between the bolthead 18 and the flange 27.

Between the parts 13 and 14 of the lever 12 a space 28 is provided which houses the plates 25 and a stack of moveable plates 29 and spacing plates 30.

The plates 25 are substantially circular and are separated from each other adjacent to the shank 19 by the smaller spacing plates 26.

The plates 29 are elongated and rectangular and are separated from each other by the smaller spacing plates 30.

The plates 29 and 30 are mounted in the space 28 on bolts 31 passing through holes in the part 14 of the lever 12, said bolts being held in position by nuts 32. Shallow bores 33 are provided on the inside surface of the part 13 to receive bolt heads 34.

Alternatively the plates 29 and 30 may be non-rotatably mounted on a single bolt 31, e. g. one with a square shank.

The edges of the plates 29 remote from the bolts 31 are interleaved with the discs 25 adjacent to the edges of the latter.

A trigger lever 35 is pivotally mounted between brackets 36 secured to the part 13 of the lever 12 and carries a spur 37 and a pin 38. The spur is normally pressed against a pin 39 by means of a spring 40 located in a bore 41 in the lever 12, the outer end of the spring surrounding the pin 38. The pin 39 is located in a hole in the part 13 and the pressure thereon is transferred to the interleaved parts of the plates 25 and 29.

The plates are made as thin as practicable so that, when pressed together, any tendency towards movement of one stack relative to the other is resisted by an invisible or scarcely visible undulation or corrugation of the plates adjacent to the area of mutual engagement as well as by friction.

To facilitate this distortion a small depression 14A is formed on the inside of the part 14 of the lever 12 opposite the pin 39.

Normally therefore rotation of the lever 12 about the axis of the bolt 17 is prevented. To allow such rotation the pressure of the spur 37 on the pin 39 is released by pressing an end 42 of the lever 35 towards an end 43 of the lever 12 against the pressure of the spring 40.

In the application of the invention shown in Figs. 1 and 2, the lever 12 may be a brake lever pivotally connected through a tail piece 44 to an operating rod 45.

Referring to Figs. 3, 4 and 5, certain parts have the same reference numerals as before. A bearing member 46 corresponding to 23 is cylindrical and flanged at one end and is stepped towards its other end where it has a square shank 47 housed in the bracket 11. Another bearing member 48 is of flanged cylindrical external form and has a bore of square section by means of which it is non-rotatably mounted on the shank 47. The plates 25 and 26 are non-rotatably mounted on the shank 47 between the stepped part of the member 46 and the unflanged end of the member 48.

The plates 29 and 30 are mounted in the space between the parts 13 and 14 of the lever 12.

The member 46 is secured to the bracket 11 by a nut 49 on a screw threaded extension of the member and has a cylindrical bore through which passes an axle 50 having a screw threaded extension screwed into a hole in a bracket 51. The axle 50 is held in position in the bracket 51 by a nut 52 and the bracket is secured to the lever 12 as by screws 53.

The other end of the axle 50 forms the shaft of a winding drum or the like.

The lever 12 is rotatably mounted on the members 46 and 48 between the flanges thereof but is normally held against rotation by spring pressure forcing the spur 37 against the pin 39 and thence against the plates 25 and 29.

Rotation of the axle 50, e. g. by means of the lever 35 acting as a crank, is possible when the pressure against the plates 25 and 29 has been released, e. g. by pressing a crank handle 54 on the end of the lever 35 towards the lever 12.

Figure 6:
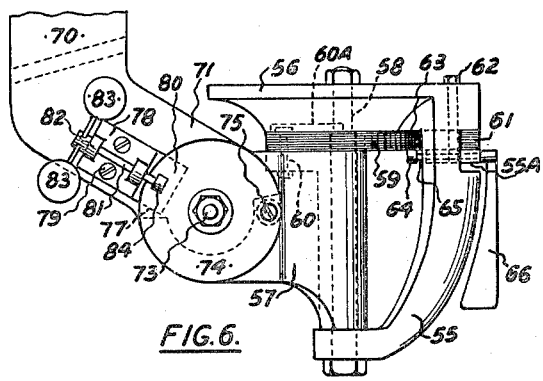
Fig. 6 is an elevation of an elbow joint for an artificial arm incorporating locking means according to the invention.
Figure 8:
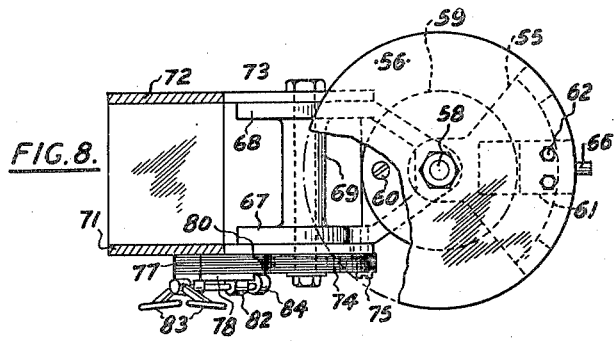
Fig. 8 is a plan view corresponding to the elevation shown in Fig. 6.

Figs. 6, 7 and 8 show the application of the invention to an elbow joint for an artificial arm.

55 is a bracket which is secured to or integral with a second bracket 56 on the lower end of the upper arm.

A third bracket 57 is rotatably mounted on a bolt 58 secured in position between the brackets 55 and 56. A stack of discs 59 (corresponding to the discs 25) is secured to the bracket 57 between 57 and 56, e. g. by a bolt 60 and is rotatably mounted on the bolt 58. An arcuate slot 60A is provided in the underside of the bracket 56 to accommodate the head of the bolt 60. A stack of plates 61 (corresponding to the plates 29) is secured to the brackets 55 and 56 as by bolts 62. The discs 59 and the plates 61 are interleaved at 63.

A cam 64 is mounted adjacent to the point 63 on one end of a spindle 65 rotatably mounted in a bracket 55A which is secured to the bracket 55 by the bolts 62. The spindle 65 has a thumb piece 66 secured to its outer end.

By means of the thumb piece, the spindle and cam may be rotated so that pressure can be applied to or released from the discs 59 and plates 61 to prevent or allow respectively rotation of the bracket 57 relative to the brackets 55 and 56 about the axis of the bolt 58.

The bracket 57 has integral wings 67 and 68 separated by a spacer 69 having a cylindrical bore. The upper end of a forearm 70 has wings 71 and 72 rotatably mounted on a bolt 73 secured in the bore of the spacer 69.

A stack of discs 74 (corresponding to the discs 25) is located on the bolt 73 and is prevented from rotating relatively to the wings 67 and 68 by a screw 75 passing through the discs 74 into the wing 67. The wing 71 is cut away as shown at 76 to enable it to clear the screw 75 during rotation about the axis of the bolt 73.

A stack of plates 77 (corresponding to the plates 29) is secured to the wing 71 by means of a cover plate 78 and screws 79 passing through the cover plate 78 and the plates 77 into the wing 71. The plates 77 and the discs 74 are interleaved at 80. A spindle 81 is rotatably mounted in brackets 82 secured to or integral with the coverplate 78. One end of the spindle carries thumb pieces 83 and the other carries a cam 84 adjacent to the point 80. By means of the thumbpieces, the spindle and cam may be rotated so that pressure is applied to or released from the discs 74 and plates 77 to prevent or allow respectively rotation of the wings 71 and 72 relative to the wings 67 and 68 about the axis of the bolt 73.

Figure 9:
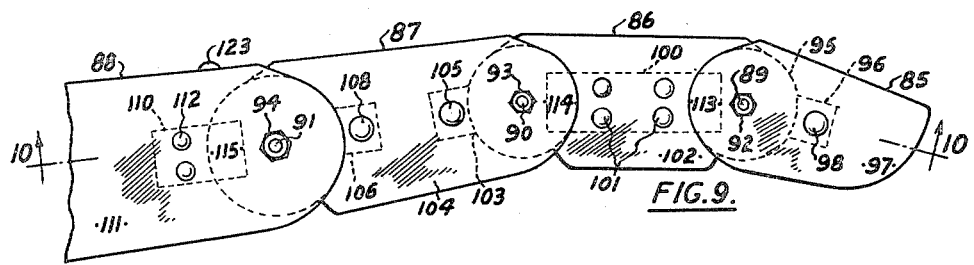
Fig. 9 is an elevation of an artificial finger incorporating locking means according to the invention.
Figure 10:
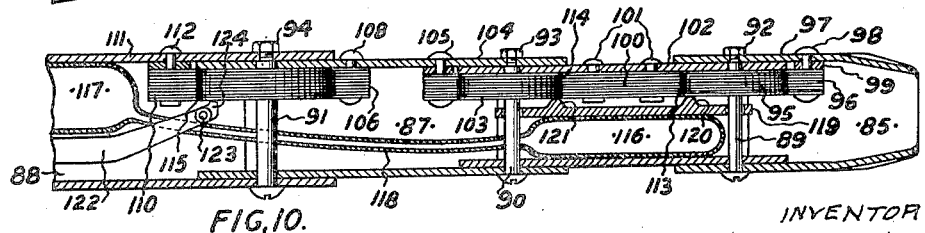
Fig. 10 is a section on the line 10—10 of Fig. 9.

Referring to Figs. 9 and 10, the finger comprises rotatably articulated parts or bones 85, 86, 87 and 88 each of which is U shaped in transverse section. The bones are successively hinged together by pins 89, 90 and 91, each passing through adjacent ends of adjacent bones. The pins are secured in position by nuts 92, 93, 94 respectively.

A stack of plates 95 is mounted on the pin 89 and each plate has an extended part 96, the stack being secured against rotation relative to the bone 85 by being connected to a depending leg 97 of the bone 85, e. g. by means of a rivet 98 passing through the extensions 96 and a spacer 99 into the depending leg 97.

A stack of plates 100 is secured as by rivets 101 to the inside of a depending leg 102 of the bone 86.

A stack of plates 103 (corresponding to the plates 95) is mounted on the pin 90 and is secured to a depending leg 104 of the bone 87 at 105.

Another stack of plates 106 (corresponding to 95 and 103) is mounted on the pin 91 and is secured to the depending leg 104 of the bone 87 at 108.

Another stack of plates 110 is non-rotatably secured to a depending leg 111 of the bone 88 at 112. The pairs of plates 95 and 100, 103 and 100, 106 and 110, are interleaved at points 113, 114, 115 respectively.

Two flexible containers 116 and 117 for fluid under pressure are housed in the bones 86 and 88 respectively and are joined by a pipe 118. A plate 119 is slidably mounted on the pins 89 and 90 between the container 116 and the plates 100. The plate 119 has projections 120 and 121 adjacent to the points 113 and 114 respectively. A lever 122 is pivoted on a pin 123 to the bone 88 and carries a spur 124 adjacent to the point 115 and its other end is disposed adjacent to the container 117.

When the containers 116 and 117 are in a collapsed condition no pressure is applied at the points 113, 114 and 115 to the interleaved plates and free relative rotation of adjacent bones can take place. The bones are then moved into position, e. g. around an article to be moved. Pressure fluid is then supplied to the containers 116 and 117, e. g. from an armpit bulb. The containers expand, and the projections 120 and 121 and the spur 124 are pressed against the interleaved plates, thereby retaining bones in their required positions.

In the forms of the invention shown in Figs. 6 to 10 inclusive, the various stacks of plates are preferably provided with spacers, such as 26 and 30, adjacent to the point of attachment or mounting of each stack. For convenience these spacers have been omitted from Figs. 6 to 10.

In all forms of the invention depressions similar to 44A and for the same purpose, are provided for example on the inside surface of the depending leg 104 of the bone 87 at the point 115.

I claim:

1. Improved means for locking relatively rotatable members in any desired relative position, comprising a stack of substantially parallel plates secured to one member, a second stack of substantially parallel plates secured to the second member, said stacks of plates being interleaved over a comparatively small area adjacent to the edge of each stack, and means for applying pressure to or removing pressure from said interleaved area to prevent or allow relative rotation of said stacks of plates.

2. Improved means for locking a control lever which is rotatable on a bracket in any desired position relative to said bracket, said control lever being rotatably mounted on a spindle and having an internal cavity, and said spindle being non-rotatably secured to said bracket, said locking means comprising a stack of substantially parallel discs non-rotatably and centrally secured on said spindle and within said cavity, a stack of substantially parallel plates secured to said lever within said cavity at a point outside the periphery of said discs, the free edges of said plates being interleaved with the edges of said discs over a comparatively small area, and means for applying pressure to or removing pressure from said interleaved area to prevent or allow relative rotation of said stacks.

3. Improved locking means as in claim 2, the inner surface of the wall of said cavity adjacent to said interleaved area and on the side of said plates and discs remote from the point at which pressure may be applied to said area having a slight depression formed therein.

4. Improved locking means as in claim 2, said means for applying pressure to or removing pressure from said interleaved area comprising a trigger lever pivotally mounted on the outside of said control lever, a spur on one end of said trigger lever, a pin located in a hole in said control lever, said spur bearing on the outer end of said pin and the inner end of said pin bearing on said interleaved area and means normally forcing said spur against said pin and said pin against said interleaved area.

5. An improved joint for an artificial limb comprising a first bracket, an axle secured to said first bracket, a second bracket rotatably mounted on said axle, a stack of substantially parallel discs secured to said second bracket and rotatably mounted on said axle, a stack of substantially parallel plates secured to said first bracket, said stacks being interleaved over a comparatively small area adjacent to the edge of each stack, an axle secured to said second bracket and perpendicular or otherwise inclined to said first axle, a third bracket rotatably mounted on said second axle, a stack of substantially parallel discs secured to said second bracket and mounted on said second axle, a stack of substantially parallel plates secured to said third bracket, said stacks being interleaved over a comparatively small area adjacent to the edge of each stack and means for applying pressure to or removing pressure from either or both of said interleaved areas to prevent or allow relative rotation of said interleaved stacks, said first and third brackets being adapted to be secured to the respective parts of an artificial limb.

6. An improved joint as in claim 5 including a slight depression on the surface of said first bracket adjacent to said first interleaved area and on the side of said discs and plates remote from said means for applying pressure to said interleaved area and a slight depression on the surface of said third bracket adjacent to said second interleaved area and on the side of said discs and plates remote from said means for applying pressure to said interleaved area.

7. An improved joint as in claim 5, said means for applying or removing pressure comprising a cam and a lever.

8. An improved artificial finger comprising a multiplicity of rotatably articulated parts or bones and means as in claim 1 for locking said parts in any desired relative position.

9. An improved artificial finger comprising four parts or bones, each said bone being U shaped and in transverse section, each pair of bones being rotatably connected by a pin passing through adjacent ends of said bones, a first stack of substantially parallel and disc shaped plates secured to the first or free bone and mounted on the first of said pins, a second stack of discs secured to the third of said bones and mounted on the second of said pins, a third stack of discs secured to said third bone and mounted on the third of said pins, a fourth stack of plates secured to the second of said bones, said fourth stack being interleaved with said first and second stacks respectively over comparatively small areas adjacent to the edge of each stack, a fifth stack of plates secured to the fourth of said bones, said fifth stack being interleaved with said third stack over a comparatively small area adjacent to the edge of each stack and means for applying pressure to or removing pressure from one or more of said interleaved areas to prevent or allow relative rotation of said interleaved stacks.

10. An improved artificial finger as in claim 9, including slight depressions on the surface of said second bone adjacent to said first and second interleaved areas respectively and on the side of said fourth stack remote from said means for applying pressure to said interleaved areas and a slight depression on the surface of said third bone adjacent to said third interleaved area and on the side of said third stack remote from said means for applying pressure to said interleaved area.

11. An improved artificial finger as in claim 9 including means for applying pressure to or removing pressure from all of said interleaved areas simultaneously.

12. An improved artificial finger as in claim 10, said means for applying pressure being actuated by fluid under pressure.

13. Improved locking means as in claim 3, said means for applying pressure to or removing pressure from said interleaved area comprising a trigger lever pivotally mounted on the outside of said control lever, a spur on one end of said trigger lever, a pin located in a hole in said control lever, said spur bearing on the outer end of said pin and the inner end of said pin bearing on said interleaved area and means normally forcing said spur against said pin and said pin against said interleaved area.

14. An improved joint as in claim 6, said means for applying or removing pressure comprising a cam and a lever.

15. An improved artificial finger as in claim 11 including means for applying pressure to or removing pressure from all of said interleaved areas simultaneously.

16. An improved artificial finger as in claim 10, said means for applying pressure being actuated by fluid under pressure.

17. An improved artificial finger as in claim 10, said means for applying pressure being actuated by fluid under pressure.

18. An improved artificial finger as in claim 11, said means for applying pressure being actuated by fluid under pressure.

19. An improved artificial finger as in claim 12, said means for applying pressure being actuated by fluid under pressure.

H. E. JEFFERY.

REFERENCES CITED

The following references are of record in the file of this patent:

UNITED STATES PATENTS

| Number | Name | Date |
|---|---|---|
| 507,831 | Mundy | Oct. 31, 1893 |
| 1,088,595 | Larkin | Feb. 24, 1914 |
| 1,253,823 | Hobbs | Jan. 15, 1918 |
| 1,507,680 | Pecorell et al. | Sept. 9, 1924 |
| 2,091,919 | Freeborn | Aug. 31, 1937 |
| 2,378,688 | Codlin | June 19, 1945 |